July 1, 1969 R. S. HUBBELL 3,453,391

SIGNAL CONVERTER CIRCUIT

Filed May 11, 1966 Sheet 1 of 7

INVENTOR
R. S. HUBBELL
BY [signature]
ATTORNEY

July 1, 1969 R. S. HUBBELL 3,453,391

SIGNAL CONVERTER CIRCUIT

Filed May 11, 1966 Sheet 3 of 7

July 1, 1969 R. S. HUBBELL 3,453,391

SIGNAL CONVERTER CIRCUIT

Filed May 11, 1966 Sheet 5 of 7

3,453,391
SIGNAL CONVERTER CIRCUIT

Richard S. Hubbell, Hinsdale, Ill., assignor to American Telephone and Telegraph Company, New York, N.Y., a corporation of New York Filed May 11, 1966, Ser. No. 549,279
Int. Cl. H04m 3/06
U.S. Cl. 179—16 12 Claims

ABSTRACT OF THE DISCLOSURE

A Touch-Tone to dial pulse converter is provided which stores digits which have been keyed into a Touch-Tone receiver, and passes the number by dial pulses to a register circuit, known as a subscriber sender, to set the six counting relays of the sender. The converter circuit includes a chain circuit for controlling operation of a "stop pulsing" relay which is used to terminate the dial pulses for each digit. The chain circuit contacts are arranged to provide early "forced" operation of selected relays followed immediately by either one or two pulses required to simulate the normal counting operation, thereby reducing the maximum number of dial pulses required to be transmitted to the sender to two for any digit.

This invention relates to a number transfer circuit and more particularly to a circuit for transferring a telephone number represented by direct current pulses to a register circuit.

For many years in the field of automatic telephony the only call transmitting device commonly available to the subscribers or customers was the well-known rotary dial. However, in recent years a new type of signaling utilizing pushbutton sets, commonly referred to as Touch-Tone telephones has been introduced and is becoming increasingly popular.

Since Touch-Tone calling involves multifrequency signaling as contrasted to the DC signals of rotary dial calling, it follows that a customer changeover involves not only a change in the substation equipment from a dial telephone to a Touch-Tone telephone but involves a modification of the central office equipment as well. In order to facilitate the changeover programs, the central office equipment is preferably modified in such a way that it is able to serve calls originating at either a dial telephone or a Touch-Tone telephone. This permits the changeover for individual customers from dial to Touch-Tone to be made on a random basis.

A central office modification usually includes the addition of a Touch-Tone receiver which receives digit-representing frequencies or tones and which operates in conjunction with a "Touch-Tone to dial pulse" converter which converts the receiver output to electrical pulses and transfers the pulses to a counting or register circuit; counting relays in this circuit count the pulses for each digit.

In connection with the operation of the above type of arrangement it has been observed on occasion that the pulses cannot be passed from the converter into the register at a sufficiently high rate of speed to keep up with the external call transmitting speed. This is true particularly when certain special types of call transmitters are used by the customer such as the card dialer disclosed in the J. H. Ham et al. application Ser. No. 291,770, filed July 1, 1963, entitled "Call Transmitter."

Accordingly, it is an object of my invention to improve the performance of central office systems adapted to serve either dial or Touch-Tone calls.

Another object of the invention is to make feasible faster in-dialing from station instruments to central office equipment.

A more specific object of the invention is to reduce the time required for transferring a number registered in a pulse converter to the associated register.

A still further specific object of the invention is to reduce the number of pulses needed to be transmitted from the converter to the register in order to operate the counting relays of the register.

In accordance with a specific embodiment of the invention, a Touch-Tone to dial pulse converter is provided which stores the digits, which have been keyed into the Touch-Tone receiver, and passes the number by dial pulses to a register circuit, which is known in this type of system as a subscriber sender, whereby to set the six counting relays of the sender. The converter circuit includes a chain circuit for controlling operation of the "stop pulsing" relay which is used to terminate the dial pulses for each digit and for each interdigital interval. A novel arrangement of contacts is included in the chain circuit whereby to provide early "forced" operation of selected ones of the counting relays followed immediately by transmission of either the one or two pulses required to simulate the normal counting operation. This results in reducing the maximum number of dial pulses required to be transmitted to the sender to two for any digit. Means are included whereby digits beyond the recycle limit are sent with the full dial value; this allows pulsing into an auxiliary register or sender without modification.

A feature of the present invention is means for directly setting selected counting relays of the register.

A further feature of the invention is means for operating in conjunction with the setting means for transmitting any additional pulses required to simulate the normal counting operation.

A still further feature of the invention is means for inhibiting the direct setting means after a predetermined number of digits have been transmitted.

A full understanding of the arrangement contemplated by the invention, as well as an appreciation of the various features thereof, may be gained from consideration of the following detailed description in connection with the accompanying drawing, in which.

*General description*

The arrangement and operation of the various components of the illustrative embodiment of the invention will be described in detail subsequently with reference to FIGS. 2 to 7. However, in order to first gain a general overall understanding of the arrangement, a brief general description will be given at this point with reference to FIG. 1.

Figures 1, 8:
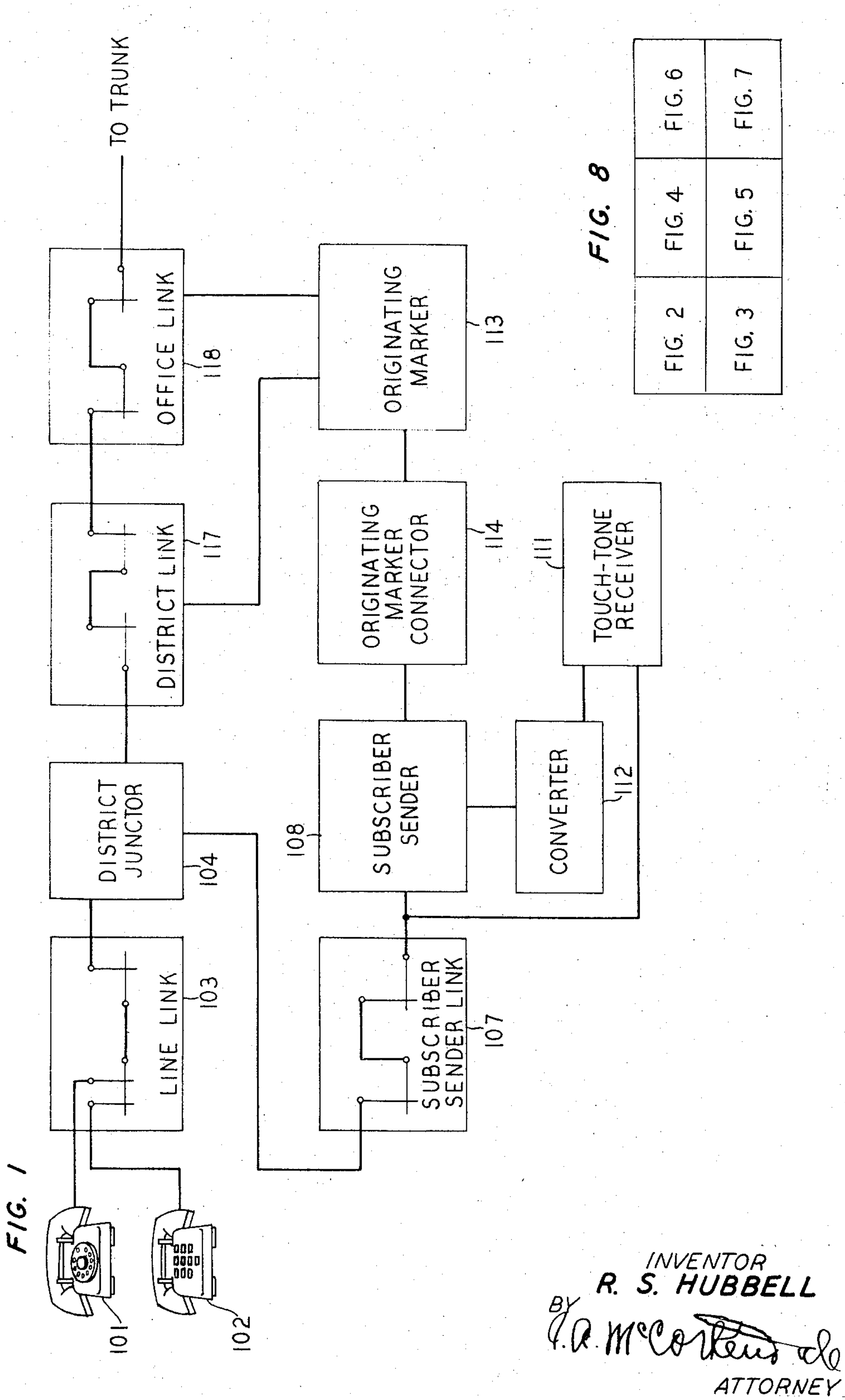
FIG. 1 shows schematically the arrangement and relationship of certain of the basic individual equipment units and circuits which comprise one illustrative embodiment of the invention.
FIG. 8 shows the manner in which certain of the figures should be arranged to show the specific illustrative embodiment of the invention.
Figure 2:
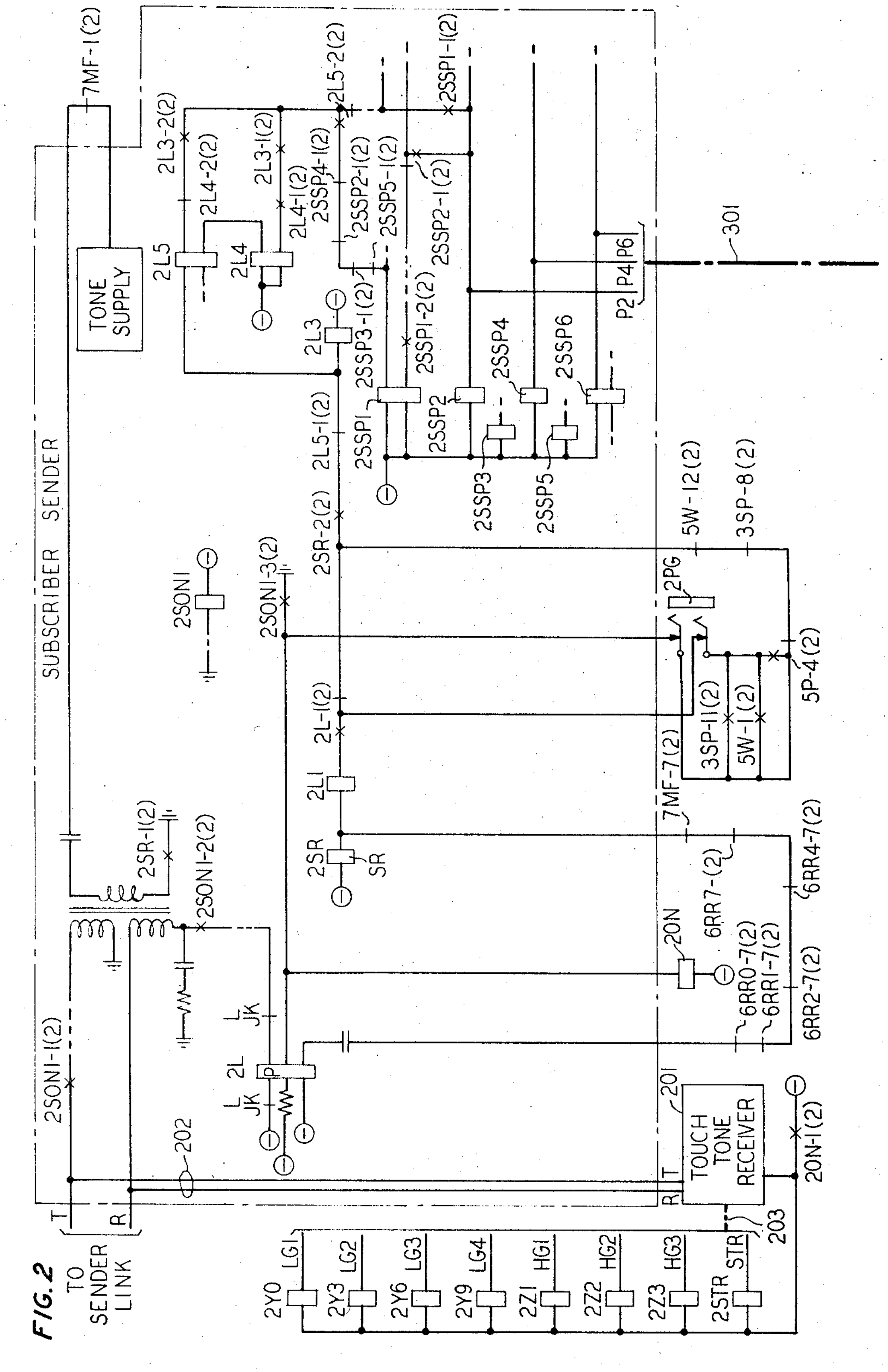
FIG. 2 shows particularly certain of the major portions of a subscriber sender dial pulse counting circuit.
Figure 3:
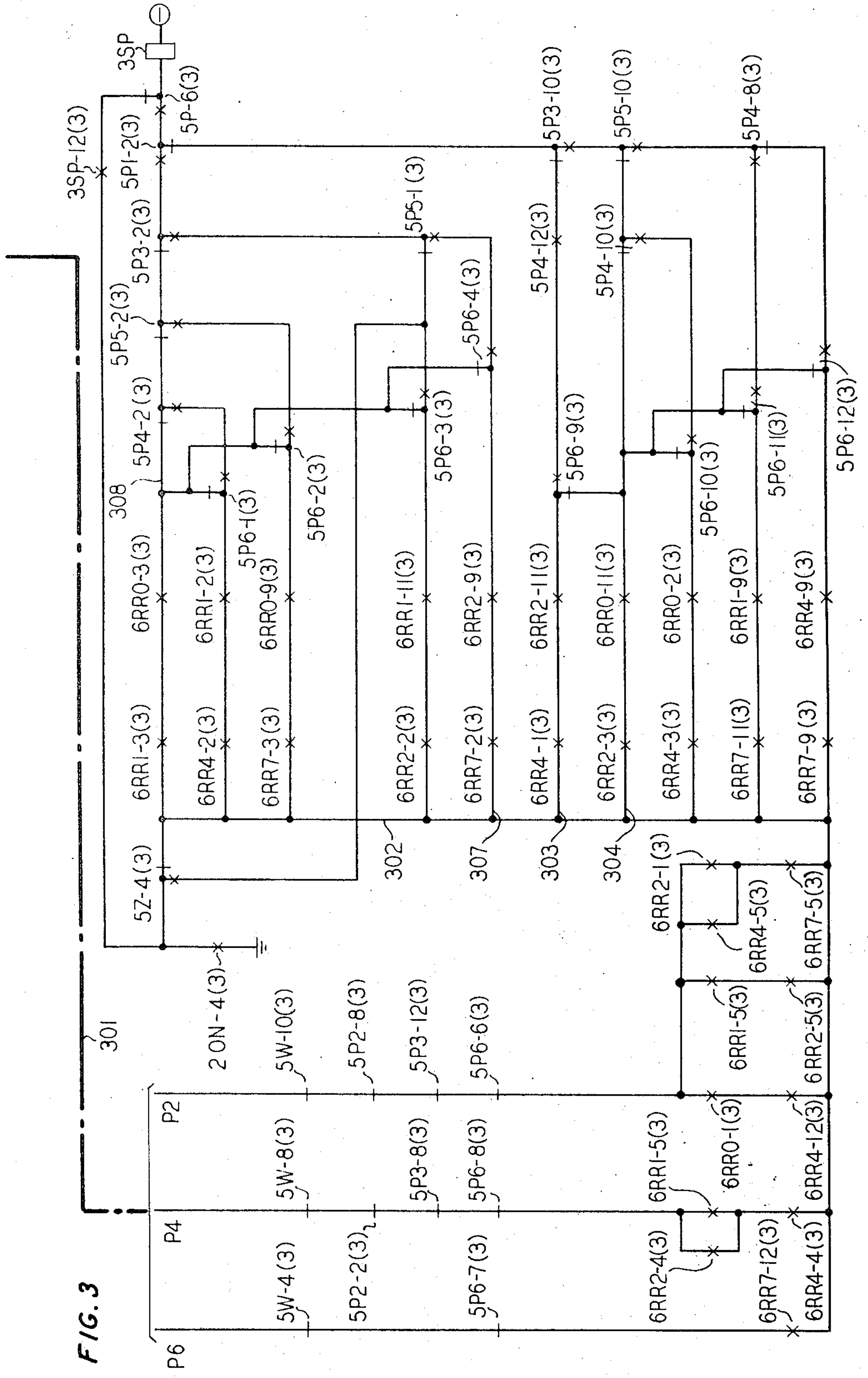
FIG. 3 shows particularly the stop pulsing relay circuit of the converter.
Figure 4:
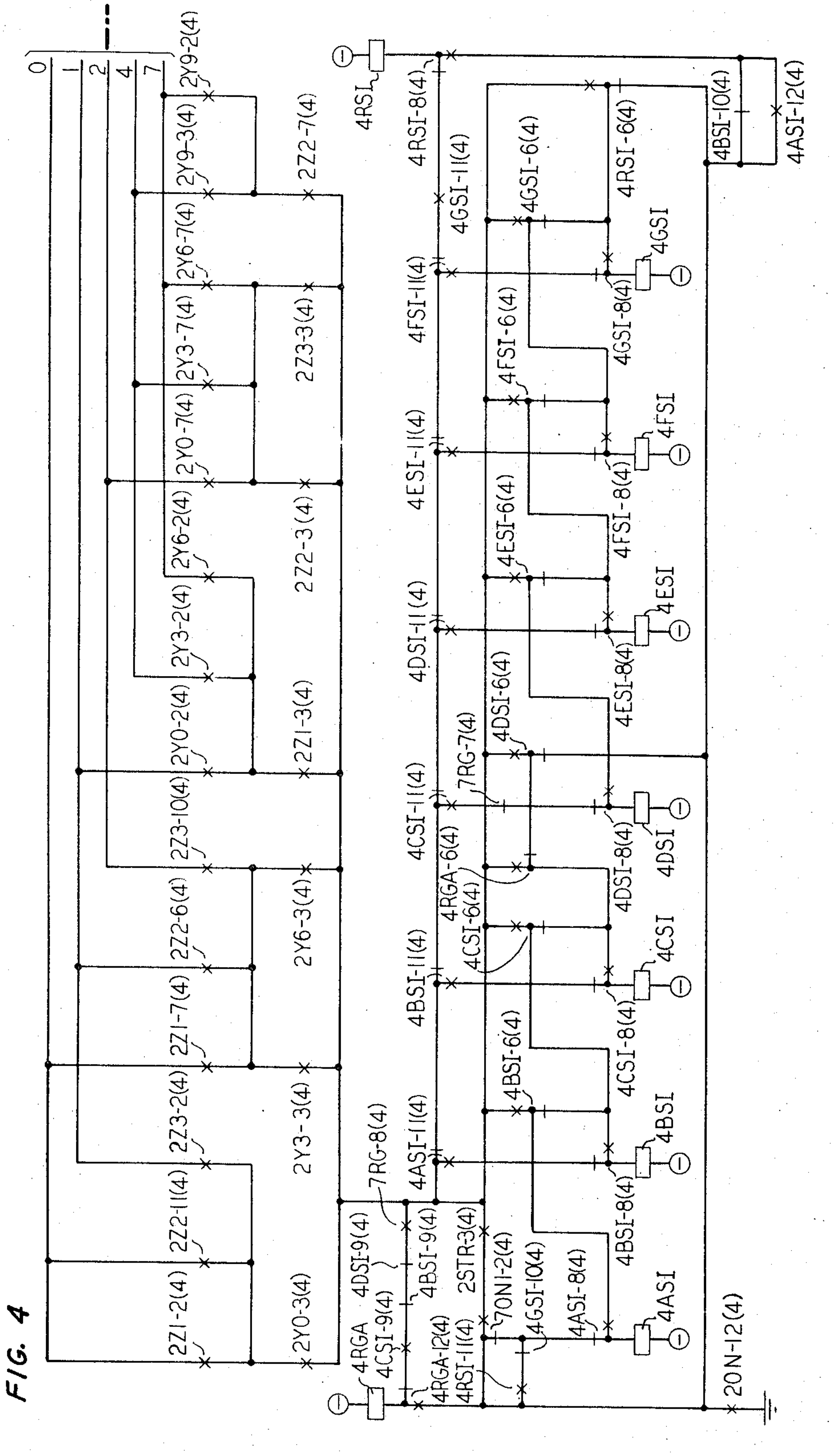
FIG. 4 shows particularly the input digit steering circuit of the converter.
Figure 5:
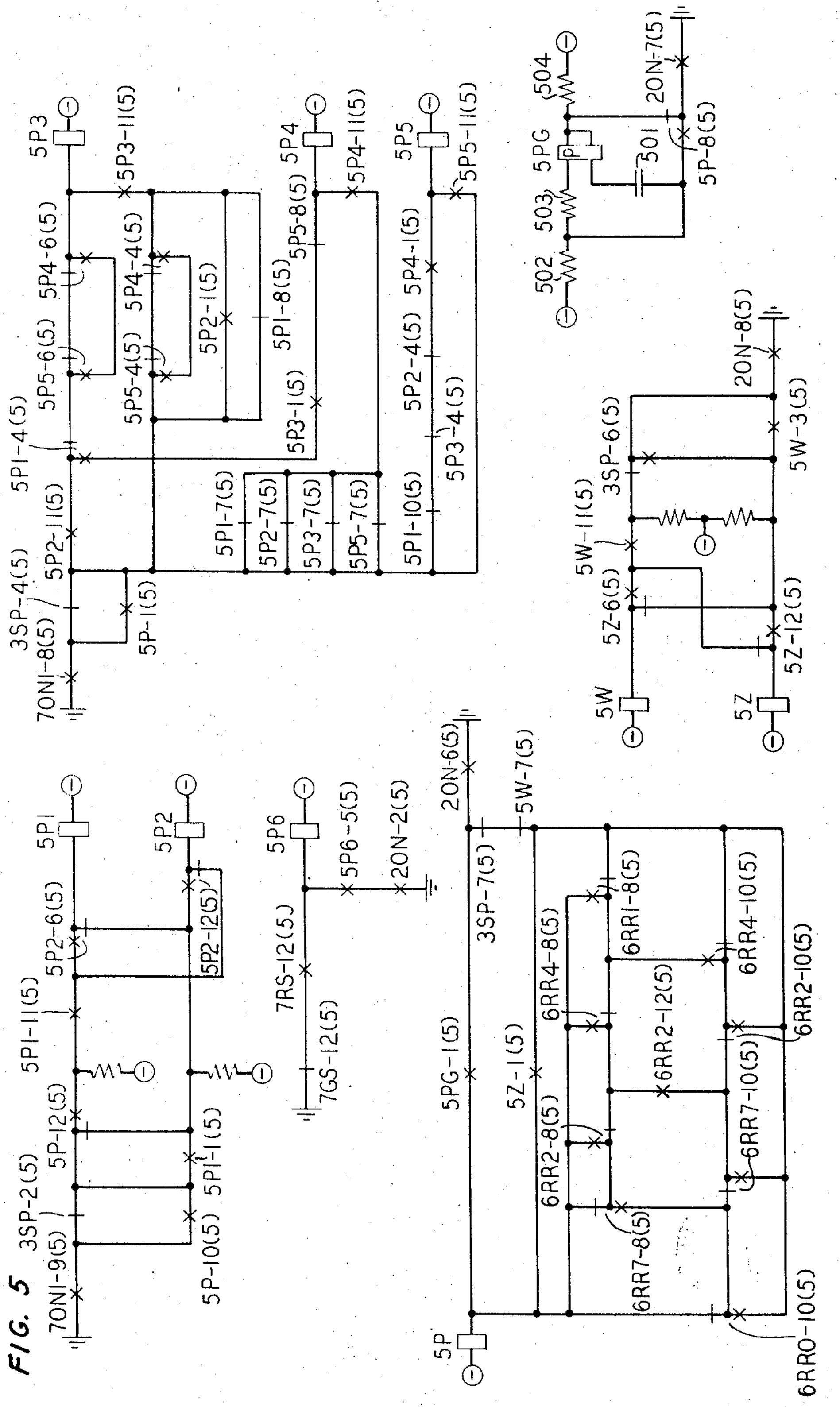
FIG. 5 shows particularly the dial pulse control relays of the converter.
Figure 6:
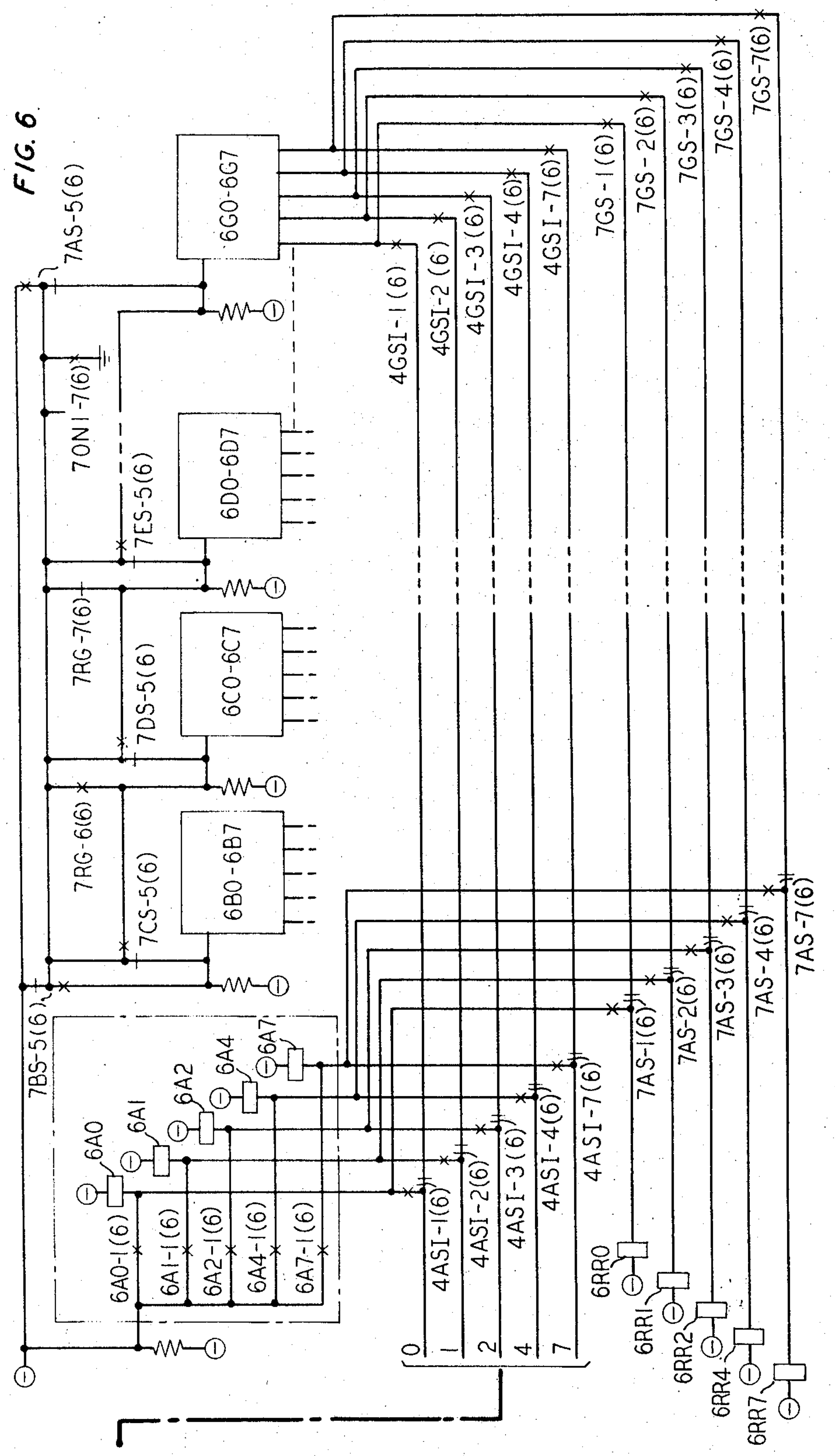
FIG. 6 shows particularly the digit registering circuit of the converter.
Figure 7:
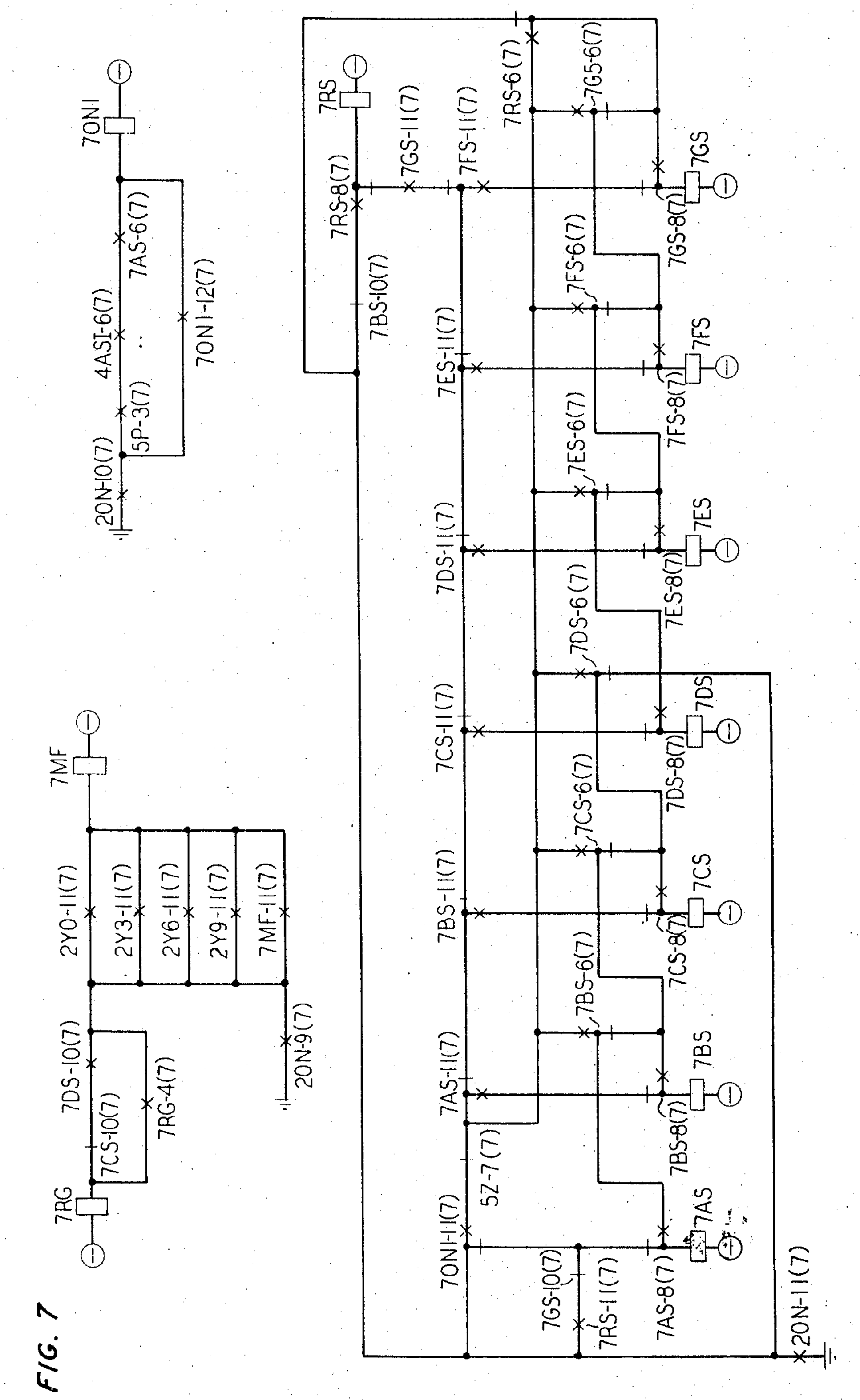
FIG. 7 shows additional portions of the input digit steering circuit.

Referring then to FIG. 1 there is shown schematically a portion of a crossbar telephone exchange system modified for serving either dial telephones, represented by telephone set 101, or Touch-Tone telephones, represented by telephone set 102. This type of crossbar telephone exchange is known as a No. 1 Crossbar System; my invention, however, is not to be considered as limited to the depicted type of exchange. When a customer originates a call through the crossbar office he is connected through line link 103, district junctor 104 and subscriber sender link 107 to subscriber sender 108 which, in this system, includes a register circuit. Subscriber sender 108 in most instances is provided with a line relay, which is connected to the ring side of the line, and is associated with Touch-Tone receiver 111, which is connected to the tip and ring sides of the line and Touch-Tone to dial pulse converter 112 which is connected between the Touch-Tone receiver and the sender. In the terminology of the No. 1 Crossbar System, the register circuit with which we are here concerned is commonly referred to as a subscriber sender; it may be referred to hereinafter interchangeably as "register," "subscribers sender" or simply as "sender."

A call originated by a dial telephone, as telephone set 101, causes the line relay of sender 108 to release and reoperate in step with the dial pulses of the number dialed. Counting relays in the sender count the pulses for each digit and register the successive digits on the crosspoints of a crossbar switch. A Touch-Tone call, as originated by Touch-Tone telephone 102, causes Touch-Tone receiver 111 to translate the incoming signal frequencies to a three-by-four DC code; the receiver transmits this information to converter 112. Converter 112 temporarily registers the keyed digits on two-out-of-five memory relays, converts the signals received from receiver 111 to corresponding dial pulses, and pulses the keyed digits into subscriber sender 108 with as little delay as possible. The counting relays of the sender count the dial pulses as they are received from the converter and register the keyed digits on the crossbar switch; the counting relay, or relays, standing operated at the completion of the pulsing in each instance determines the digit registered. Calls from both the dial telephone and the Touch-Tone telephone are served by the same counting relays of sender 108 and the same crossbar switch.

The pulses of each digit are counted in the sender on six counting relays which commonly are operated in rotation under control of the sender line relay in the instance of dial telephone calls and under control of the converter pulsing relay in the instance of Touch-Tone calls. As stated above, it has frequently been found that it has been impossible to pass the pulses from the converter into the sender at a sufficiently high rate of speed to keep up with the external call transmitting speed particularly when certain special types of high speed transmitters are being used. Accordingly, in a manner which will be described in detail subsequently with particular reference to FIGS. 2 to 7, the converter is so arranged that early "forced" operation is cause of selected ones of the counting relays of subscriber sender 108; this is followed immediately by transmission of either the one or two pulses required to simulate the normal counting operation. The result is that regardless of the particular digit involved no more than two dial pulses need be transmitted from converter 112 to subscriber sender 108. Means are preferably included which are effective at the recycle limit of converter 112 for inhibiting the means referred to so that additional pulses are sent with their full pulse value; this is desirable from the standpoint of the operation of auxiliary senders which may be also provided, as is known in the art.

At one or more points during the establishment of the call, subscriber sender 108 is connected to originating marker 113 via originating marker connector 114; calling information is transmitted between these units and from marker 113 through district link 117 and office link 118 to the trunk in the well-understood manner.

*Detailed description*

Coming now to a more detailed description of the specific illustrative embodiment of the invention with particular reference to FIGS. 2 to 7 of the drawing, the circuits are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding or the like is preceded by a numeral indicating the figure of the drawing in which the apparatus appears, for example, the winding of relay 5P1 appearing in FIG. 5. Further, each contact designation is followed by a numeral in parentheses which indicates the figure of the drawing in which the contact appears, for example, the designation "5P1–2(3)" indicates that contact No. 2 of relay 5P1 appears in FIG. 3 while the relay winding, as pointed out above, appears in FIG. 5. In accord with usual circuit design, transfer contact pairs may be either early make-break (continuity) or early break-make (sequence transfer) as dictated by the particular circuit operational requirements.

Referring then to FIGS. 2 to 7 for a more detailed description of the illustrative embodiment of the invention a description will first be given of the various major equipment units involved, after which their functioning in connection with typical number transmissions will be described. Since the general method in which the desirable inventive features are attained is most readily apparent from consideration of the "stop pulsing" relay circuit, two versions of this particular circuit will be described, first an arrangement referred to as the "normal" circuit where the inventive arrangement is, in effect, inhibited, and second the "modified" circuit wherein the inventive arrangement is effective. As pointed out above in reference to FIG. 1, each subscriber sender (FIG. 2) arranged to function with Touch-Tone calling customer sets is permanently associated with a converter and a Touch-Tone calling receiver (as represented by captioned rectangle 201). As shown the receiver 201 is connected to the subscriber sender over line 202 and is connected to input leads of the converter by cable 203 which is indicated by a heavy, dash-dot line.

*Seizure of converter*

The converter being permanently associated with the subscriber sender is brought off-normal each time the sender is seized. The sender relay 2SONI, operated by ground applied from the subscriber sender link over a path not shown in detail, closes a path at make contact 2SONI–3(2) for operating converter off-normal relay 2ON. Relay 2ON, operated, closes a path at make contact 2ON–1(2) for supplying enabling battery to Touch-Tone receiver 201 and also applies battery to one side of the windings of the receiver output relays of the converter. Also, relay 2ON, operated, closes at make contact 2ON–12(4), an operate path for A-digit in-steering relay 4ASI; closes at make contact 2ON–11(7) an operate path for A-digit out-steering relay 7AS; and closes at make contact 2ON–6(5) a path for operating pulsing relay 5P. Relay 7ON1 now operates over a path through make contacts 2ON–10(7), 5P–3(7), 4ASI–6(7) and 7AS–6(7) and, upon operating locks to the off-normal ground through its own make contact 7ON1–12(7). Relay 7ON1, operated, opens the initial operate paths of the steering relays at the break contacts of respective transfer pairs 7ON1–2(4) and 7ON1–11(7).

If the incoming call originated at a dial telephone, as telephone set 101, no further action will take place in the converter since dial pulse signals have no effect on the Touch-Tone receiver or the converter. Assuming, however, that the call originated at a Touch-Tone telephone, as telephone set 102, Touch-Tone receiver 201 will detect the signals and signal the converter as described below.

*Touch-Tone calling*

The frequencies used in Touch-Tone calling consists of four in a low band and three in a high band and each digit is assigned a combination of one from each band. The Touch-Tone receiver 201 detects these combinations and places a signal on a corresponding combination of leads to the converter. The digit leads (FIG. 2) between the receiver and converter are designated LG1 to LG4 (low band) and HG1 to HG3 (high band). The relays associated with these leads are designated 2Y0, 2Y3, 2Y6, 2Y9 and 2Z1, 2Z2 and 2Z3 respectively and the assignment of the frequencies and relays for each digit is made in accordance with a definitely conceived plan. In addition to the digit signals, the Touch-Tone receiver places a signal on the steering lead STR for each digit; the associated relay 2STR operates while the digit signal is present.

*Input digit steering*

As pointed out above, when the converter has been seized, input steering relay 4ASI operates and locks through the make contact of its transfer pair 4ASI–8(4) and the break contacts of respective transfer pairs 4BSI–6(4), 4CSI–6(4), 4RGA6(4) and 4DSI–6(4) to the ground at make contact 2ON–12(4). Relay 7ON1 subsequently operates and locks, as also directed above, whereby to place the input steering relays under control of relay 2STR.

When Touch-Tone receiver 201 detects a digit, relay 2STR is operated over lead STR; input digit steering relay 4BSI now operates from ground at make contact 2ON–12(4), make contact of transfer pair 7ON1–2(4), make contact 2STR–3(4), make contact of transfer pair 4ASI–11(4), break contact of transfer pair 4BSI–8(4), winding of relay 4BSI to battery. Relay 4BSI upon operating locks to the off-normal ground through the make contact of its transfer pair 4BSI–8(4) and the respective break contacts of transfer pairs 4CSI–6(4), 4RGA–6(4) and 4DSI–6(4). Also, the holding circuit for relay 4ASI is now transferred via the make contact of tansfer pair 4BSI–6(4) to a path through make contact 2STR–3(4) and the make contact of transfer pair 7ON1–2(4) to the off-normal ground.

When relay 2STR releases at the end of the digit the holding path for relay 4ASI, just referred to, is interrupted and relay 4ASI releases whereby to enable the B digit register through the operated 4BSI relay. Each succeeding digit steering relay is operated in a similar manner. When the recycle point is reached, that is when relay 2STR operates with relay 4GSI operated, the recycle relay 4RSI operates from the off-normal ground through the make contact of transfer pair 7ON1–2(4), make contact 2STR–3(4), the break contacts of respective transfer contacts of the released input digit steering relays, make contact 4GSI–11(4), break contact of transfer pair 4RSI–8(4), winding of relay 4RSI to battery; relay 4RSI upon operating locks to the off-normal ground through the make contact of its transfer pair 4RSI–8(4) and break contact 4BSI–10(4) and transfers the holding path for relay 4GSI through the make contact of transfer pair 4RSI–6(4) to a path controlled by make contact 2STR–3(4). When relay 2STR releases at the end of the digit, relay 4GSI releases after which relay 4ASI operates from the off-normal ground through make contact 4RSI–11(4), break contact 4GSI–10(4) and the break contact of transfer pair 4ASI–8(4). Operation of the input digit steering relays on recycle is generally the same as on the first cycle.

*Digit registration*

The digits are registered in the converter on a two-out-of-five basis on seven groups of relays; each group consists of five relays. For example, the A-digit group comprises relays 6A0, 6A1, 6A2, 6A4 and 6A7 which are shown in detail in FIG. 6. The respective groups for the other digits are similar in arrangement and are not shown in detail in order to avoid undue complication of the drawing.

The digits received from Touch-Tone receiver 201 are translated by the 2Y- and TZ- relays from the four-by three code to the two-out-of-five code for registration on the respective group relays. Each used combination of two frequencies results in ground being connected to two of the 0, 1, 2, 4 and 7 leads to the input digit steering circuit (FIG. 4) wherein the operated relay connects these grounds to the register relays.

*Output steering*

The output steering circuit consists of one relay per digit and one recycle steering relay. As previously pointed out above, at the time the converter is seized relay 7AS operates from the off-normal ground at make contact 2ON–11(7) and locks to the ground through break contacts of the transfer pairs of relays 7BS, 7CS and 7DS. Subsequently relay 7ON1 operates and places the relays under control of a path closed through break contact 5Z–7(7); relay 5Z operates after each digit is pulsed out. Following operation of relay 7ON1, relay 7BS operates from ground at make contact 2ON–11(7), make contact of transfer pair 7ON1–11(7), break contact 5Z–7(7), make contact of transfer pair 7AS–11(7), break contact of transfer pair 7BS–8(7), winding of relay 7BS to battery; relay 7BS upon operating locks to the off-normal ground through the make contact of its transfer pair 7BS–8(7), and the break contacts of transfer pairs 7CS–6(7) and 7DS–6(7), and transfers via the make contact of its transfer pair 7BS–6(7), the holding path of relay 7AS to a path through break contact 5Z–7(7) and the make contact of transfer pair 7ON1–11(7). When relay 5Z operates after the A-digit has been outpulsed relay 7AS releases; when relay 5Z releases prior to pulsing of the B-digit relay 7CS operates, and so on through operation and release of each succeeding output steering relay.

When relay 5Z releases prior to pulsing of the seventh digit, that is with relay 7GS operated, recycle steering relay 7RS operates from ground, the make contact of transfer pair 7ON1–11(7), the break contacts of respective transfer pairs of released steering relays, make contact 7GS–11(7), the break contact of transfer pair 7RS–8(7), winding of relay 7RS to battery; relay 7RS, operated, locks to off-normal ground through the make contact of its transfer pair 7RS–8(7) and break contact 7BS–10(7).

Contacts of the out-steering relays 7AS to 7GS connect the "recapture" relays 6RR0, 6RR1, 6RR2, 6RR4 and 6RR7 to the register relays for control of the outpulsing circuit as subsequently described.

*Dial registration*

Contacts of the converter pulsing relay 5P are connected in a series parallel arrangement with those of the line or supervisory relay 2L of the subscribers sender in such a way that, with both relays initially operated, pulsing of either relay will actuate the pulsing circuit of the sender. On Touch-Tone calls converter relay 5P pulses to control the counting and register relays of the sender while sender relay 2L retains the control of abandoned call supervision.

*Dialing—General*

The dialing of each digit in the converter is under control of the dial pulse generator, the pulse counting relays and the digit control relays.

*Dialing—Dial pulse generator*

The dial pulse generator of the converter consists of relays 5P and 5PG together with the associated capacitors and resistors. Relay 5PG is polarized and current reversals through the windings are controlled by relay 5P through transfer pair 5P–8(5). Relay 5P, in turn, is controlled by relay 5PG through make contact 5PG–1(5) whereby a self-interrupting circuit results.

When relay 2ON operates as described above, relay 5P operates from ground, make contact 2ON–6(5), break contacts 3SP–7(5) and 5W–7(5), break contacts of intervening 6RR- relays, winding of relay 5P to battery. Relay 5P, operated, connects off-normal ground through the make contact of its transfer pair 5P–8(5) to one side of capacitor 501 and to resistor 502 thus shunting the battery and connecting ground through resistor 503 to one side of the upper or secondary winding of relay 5PG. At this point the other side of the secondary winding and one side of the primary winding are connected to battery through resistor 504. The current in the secondary winding is in a direction to release relay 5PG while the current in the primary winding, which current is charging capacitor 501, is in a direction to operate the relay. Initially, the primary ampere turns are the more powerful and the relay operates but, as capacitor 501 becomes charged, the primary ampere turns decrease and finally the secondary winding ampere turns become controlling and cause relay 5PG to release. The circuit remains in this condition until the auxiliary circuit to relay 5P is interrupted and relay 5P releases. Relay 5P released, disconnects the ground from capacitor 501 and from resistor 502, allowing that battery to become effective, and connects ground through the break contact of its transfer pair 5P–8(5) to one side of the secondary winding of relay 5PG. This causes the current in the secondary winding of relay 5PG to reverse and flow in a direction to operate the relay and also closes a circuit for discharging and charging in the opposite direction capacitor 501 through the lower or secondary winding of the relay. As the capacitor 501 becomes charged, a relay 5PG operates, as in the first instance described, and operates relay 5P whereby to again reverse the circuits through both windings; this cycle is repeated so long as relay 5P remains under control of relay 5PG. When it is desired to stop the action an auxiliary circuit to relay 5P is closed whereby to prevent release of the relay and stop the interrupter function.

*Dialing—Operations in sender*

As previously pointed out above the sender line relay 2L, in the instance of dial pulse calls, operates and releases in step with the dial pulses as received over the line. Additional relays, as relay 2L1, operate in step with relay 2L. Relays 2L3, 2L4 and 2L5 operate under control of relay 2L and transmit the dial pulse to the sender pulse counting relays 2SSP1 to 2SSP6.

On a Touch-Tone call, as also previously pointed out above, sender line relay 2L remains operated during customer signaling while converter relay 5P pulses in accord with the keyed digit. Contacts of the respective transfer pairs 2L–1(2) (sender) and 5P–5(2) (converter) are connected in such a relationship that with both relays initially operated, either relay pulsing will actuate the pulsing circuit of the sender. That is, relays 2L3, 2L4 and 2L5 operate under control of relay 5P for a Touch-Tone call in the same manner as they are controlled by relay 2L on a dial call.

*Dialing—Pulse counting relays*

The pulse counting relays 5P1 to 5P5 of the converter are used to count the number of dial pulses generated and are then recycled and used to count the interdigital interval pulses. Relay 5P1 and 5P2 are wired as a pulse divider and relays 5P3, 5P4 and 5P5 are used to differentiate between the different pairs of pulses.

When relay 5P releases following release of relay 5PG after its first operation as described above, relay 5P1 operates from ground, make contact 7ON1–9(5), break contact 3SP–2(5), break contact of transfer pair 5P–12(5), break contact of transfer pair 5P2–6(5), winding of relay 5P1 to battery; relay 5P1 upon operating locks to the off-normal ground over a path which includes its make contact 5P1–1(5). One-half cycle later, relay 5P reoperates and relay 5P2 now operates from ground, make contact 7ON1–9(5), break contact 3SP–2(5), make contact of transfer pair 5P–12(5), make contact 5P1–11(5), break contact of transfer pair 5P2–12(5), winding of relay 5P2 to battery; relay 5P2 upon operating locks to the off-normal ground over a path which includes the make contact of its transfer pair 5P2–12(5). At the end of the cycle relay 5P releases; relay 5P1 releases as its present hold path is interrupted at the make contact of transfer pair 5P–12(5) but relay 5P2 holds over a path which includes the break contact of transfer pair 5P–12(5). On the next operation of relay 5P, relay 5P2 release; this cycle of relays 5P1 and 5P2 is then repeated for every two cycles of relay 5P.

When relay 5P1 releases at the end of the first cycle with relay 5P2 operated, relay 5P3 operates from ground, make contact 7ON1–8(5), break contact 3SP–4(5), make contact 5P2–11(5), break contacts of respective transfer pairs 5P1–4(5), 5P5–6(5), 5P4–6(5), winding of relay 5P3 to battery; relay 5P3 upon operating locks to the off-normal ground through its make contact 5P3–11(5). With relays 5P1, 5P2 and 5P3 operated during the third pulse cycle, relay 5P4 operates from ground, make contact 7ON1–8(5), break contact 3SP–4(5), make contact 5P2–11(5), make contact of transfer pair 5P1–4(5), make contact 5P3–1(5), break contact 5P5–8(5), winding of relay 5P4 to battery; relay 5P4 upon operating locks to the off-normal ground through its make contact 5P4–11(5) and remains operated until the ninth pulse cycle. Relay 5P3 releases at the start of the fifth pulse cycle but again reoperates during the eighth pulse cycle. Relay 5P5 operates during the sixth pulse cycle with relays 5P1, 5P2 and 5P3 released and relay 5P4 operated and locks to the off-normal ground through its 5P5–11(5) make contact.

*Stop pulse relay—Normal arrangement*

The stop pulse relay 3SP is used to terminate the dial pulses for each digit and for each interdigital interval. Since the novel features of the present invention are attained largely through a modification of the 3SP relay operating circuit it appears that the advantages of the inventive arrangement may be readily apparent through comparison of the modified arrangement with the prior or normal arrangement.

Accordingly the operation and arrangement of the normal circuit will first be described. As will be subsequently described in detail the modification comprises basically the provision of a controlling relay 5P6 and the strategic location of contacts of this relay in the various paths immediately associated with the 3SP relay. Since, for a purpose which will be described subsequently, operation of the 5P6 relay restores the paths to their normal condition, it will be assumed first, for consideration of the normal condition of the 3SP relay circuit, that relay 5P6 is in operated position.

It will be recalled that as the dial pulse generator (relays 5P and 5PG) operates, the number of operations of relay 5P is counted on the 5P1 to 5P5 relays. Contacts of the 5P- relays are so wired as to connect the winding of relay 3SP to ten parallel points; these ten points are connected to off-normal ground at make contact 2ON–4(3) through corresponding two-out-of-five combinations of the 6RR- relays or through contacts of relay 5Z. It will be recalled also that we are assuming for purposes of present description that relay 5P6 is in operated position since we are to first describe the circuit in its normal or original condition. That is, in effect, before modification in accordance with the present invention.

It will be assumed first that six pulses are to be transmitted; relays 6RR4 and 6RR2 will accordingly be operated. Now when the 5P- relays, operating under control of relays 5P and 5PG, have counted up to the combination of "6," relays 5P1 and 5P3 being normal and relay 5P4 being operated, the off-normal ground will be connected through make contact 2ON–4(3), break contact of transfer pair 5Z–4(3), make contacts 6RR4–1(3) and 6RR2–11(3), make contact of transfer pair 5P6–9(3), make contact 5P4–12(3), break contacts of transfer pairs 5P3–10(3) and 5P1–2(3), make contact of transfer pair 5P–6(3), winding of relay 3SP to battery; relay 3SP operates during the "operated" half cycle of relay 5P. It will be noted that, with the "normal" circuit condition, that is with relay 5P6 operated and with the inventive arrangement effectively inhibited, the operation of relay 3SP is delayed until a predetermined number of pulses have been transmitted and a predetermined operated-released relationship of several of the 5P counting relays has been arrived at; this represents an appreciable time period. It will be understood, of course, that as the pulses are being counted they are at the same time being transmitted to the sender under control of transfer contacts 5P–4(2).

Relay 3SP, operated, interrupts at break contact 3SP–4(5) one of the paths over which ground is supplied to the operating and holding paths of relays 5P3, 5P4 and 5P5, and interrupts at break contacts 3SP–2(5) one of the paths over which ground is supplied to the paths of relays 5P1 and 5P2. One-half cycle later relay 5P releases and connects through the break contact of its transfer pair 5P–6(3) the winding of relay 3SP to a locking path through its make contact 3SP–12(3). Relay 5P, released, also interrupts at its make contacts 5P–1(5) and 5P–10(5) the other respective paths over which ground is supplied to the 5P– counting relays whereby to release any operated relays in this group. When relay 5P released the final pulse of the first digit was transmitted through the break contact of transfer pair 5P–4(2). When relay 5P reoperates one-half cycle later, relay 3SP releases and the ground paths for operating the counting relays of the converter are restored.

Relay 3SP, operated as just described, closes an operate path for relay 5W from ground, make contact 2ON–8(5), make contact of transfer pair 3SP–6(5), break contact of transfer pair 5Z–6(5), winding of relay 5W to battery; relay 5W upon operating locks to the ground through its make contact 5W–3(5). The pulsing contacts of relay 5P [transfer pair 5P–4(2)] are now shunted both by make contact 5W–1(2) and make contact 3SP–11(2) whereby to prevent further pulsing to the 2L– relays.

On the next operation of relay 5P, the holding path of relay 3SP is interrupted at the break contact of transfer pair 5P–6(3) and relay 3SP releases. Relay 5Z now operates from ground, make contact 2ON–8(5), break contact of transfer pair 3SP–6(5), make contact 5W–11(5), break contact of transfer pair 5Z–12(5), winding of relay 5Z to battery; relay 5Z locks to ground through the make contact of its transfer pair 5Z–12(5) and relay 5W holds operated through the make contact of transfer pair 5Z–6(5).

Relay 5Z, operated, closes at the make contact of its transfer pair 5Z–4(3) a shunting path around the contacts of the 6RR– relays to the 3SP relay whereby relay 3SP will operate after the interdigital interval has been counted by the counting relays 5-P. Near the end of the interval relay 3SP operates; this releases relay 5W, at the break contact of transfer pair 3SP–6(5) and recyles the counting relays. At the end of the next cycle, relay 5P operates and releases relay 3SP; this releases relay 5Z, which was holding through the make contact of transfer pair 3SP–6(5), and restores operate control of relay 3SP to paths including contacts of the 6RR– relays and 5P– relays.

The transmission of other digits for operation of the sender counting relays is accomplished in a generally similar manner and it will be observed that in each instance a particular operated-released relation of several of the 5P– counting relays must be arrived at before the operate path for the 3SP relay is closed.

*Stop pulse relay—modified arrangement*

As previously stated above it has been found that, with the use of the arrangement just described, a "stuck sender" trouble frequently arises when a high speed type of call transmitter is being used. The trouble occurs when all the digits have been transmitted by the dialing device before the recycle feature of the converter has cleared the 6A–, 6B– and 6C–registers for accepting digits following outpulsing of the first, second and third digits. Basically, the delay results from the respective intervals necessary for the interlocking operations of the 5P– pulse counting relays before operation of relay 3SP and transmission of the pulses for setting the 2SSP– counting relays of the subscriber sender. Accordingly a novel arrangement of the 3SP relay circuit has been provided whereby to combine dial pulsing with premature operation of selected pulse counting relays of the subscriber sender. Selected sender relays are operated by only one or two pulses per digit, specifically one pulse if the digit is odd and two pulses if the digit is even.

Referring again, therefore, to the circuit of relay 3SP, it will be assumed now that relay 5P6 is in its normal released position. Also, it will be assumed again in the first instance that the digit "6" is to be transmitted.

It will be clear from subsequent description that only relays 5P1, 5P2 and 5P3 are used for outpulsing the first seven digits since, as stated above, only one or two pulses per digit are required depending upon whether the particular digit is odd or even. The normal method of pulse counting in the subscriber sender, as referred to above, requires that relays 2SSP1 through 2SSP6 operate in sequence for the first six digits; the last relay to operate represents the number of pulses received. By application of the novel features of the present invention in the manner now to be described certain of these relays are prematurely operated making it possible to register digits in the subscriber sender by sending only one or two pulses.

Assuming as before, therefore, that digit "6" is to be transmitted, relays 6RR4 and 6RR2 will be operated as before described. Now immediately upon release of relay 5Z a path will be closed for operating sender relay 2SSP4, this path being traced from ground, break contact of transfer pair 5Z–4(3), lead 302, make contacts 6RR4–4(3) and 6RR2–4(3), break contacts 5P6–8(3), 5P3–8(3), 5P2–2(3) and 5W–8(3), lead P4 included in cable 301, winding of relay 2SSP4 to battery; relay 2SSP4 operates and locks through portions of the sender counting relay circuits not shown in detail. It will be noted that this operate path is independent of the path controlled through transfer contact pair 5P–4(2).

While sender counting relay 2SSP4 has been prematurely operated, the arrangement of the sender circuits is such that registration of the digit "6" therein requires that relays 2SSP5 and 2SSP6 be operated; this will require transmission of two pulses at this point. (It will be recalled that it was stated above that after presetting of the sender relays one pulse is required for odd digits and two pulses are required for even digits.) It will be noted that, with relay 5P6 in released position, a path is completed through the break contact of transfer pair 5P6–9(3) from the "4–2" or six pulse path 303 to the "2–0" or one pulse path 304 of the 3SP relay operating matrix. Accordingly, after two pulses have been transmitted to the sender through operations of transfer pair 5P–4(2), relay 3SP operates over a path from ground, make contact 2ON–4(3), break contact of transfer pair 5Z–4(3), make contacts 6RR4–1(3) and 6RR2–11(3), respective break contacts of transfer pairs 5P6–9(3), 5P4–10(3), and 5P5–10(3), make contact of transfer pair 5P3–10(3), break contact of transfer pair 5P1–2(3), make contact of transfer pair 5P–6(3), winding of relay 3SP to battery; relay 3SP upon operating terminates pulsing to the sender as above described.

The interlocking operating paths of the sender counting relays are so arranged that, with relay 2SSP4 "forced up" or prematurely operated as described, the subsequent transmission of two additional pulses will cause the operation of relay 2SSP5, release of relay 2SSP4, and the operation of relay 2SSP6, while relay 2SSP5 holds operated, whereby to result in relays 2SSP5 and 2SSP6 standing operated and registering the digit "6" in the sender. It is apparent, therefore, that through use of the novel arrangement contemplated by the present invention the digit "6" has been registered in the sender through transmission thereto from the converter of only two pulses.

For purposes of further description we will assume an odd digit, for example "9"; in this case relays 6RR7 and 6RR2 will stand operated. Accordingly, as soon as relay 5Z has released two paths are closed to the sender counting relays. One path is traced from ground, make contact 2ON–4(3), break contact of transfer pair 5Z–4(3), lead 302, make contacts 6RR7–5(3) and 6RR2–1(3), break contacts 5P6–6(3), 5P3–12(3), 5P2–8(3) and 5W–10(3), through lead P2 of cable 301 to operate sender counting relay 2SSP2, and the second path traced from the same ground and the break contact of transfer pair 5Z–4(3), lead 302, make contact 6RR7–12(3), break contacts 5P6–7(3) and 5W–4(3) through lead P6 of cable 301 to operate sender counting relay 2SSP6.

While sender counting relays 2SSP2 and 2SSP6 have therefore been prematurely operated, the arrangement of the sender is such that the digit "9" is registered therein by operation of relays 2SSP3 and 2SSP6; with relays 2SSP2 and 2SSP6 operated the subsequent transmission of a single pulse will operate relay 2SSP3 and release relay 2SSP2 while relay 2SSP6 holds operated. It will be noted that with relay 5P6 in released position a path is completed from the "7–2" path 307 (7 pulse) through the break contact of transfer pair 5P6–4(3) to the "1–0" path 308 (1 pulse). Accordingly, after one pulse has been transmitted to the sender through operation of transfer pair 5P–4(2), relay 3SP operates from ground, make contact 2ON–4(3), break contact of transfer pair 5Z–4(3), make contacts 6RR7–2(3) and 6RR2–9(3) break contact of transfer pair 5P6–4(3), respective break contacts of transfer pairs 5P4–2(3), 5P5–2(3) and 5P3–2(3), make contacts of transfer pairs 5P1–2(3), and 5P–6(3), winding of relay 3SP to battery. Relay 3SP, operated, terminates the pulsing to the sender and counting relays 2SSP6 and 2SSP3 stand operated; the digit "9" is accordingly registered in the sender.

The novel contact arrangement is effective in the manner described with respect to each digit, except "1" and "2," first to cause premature operation of a sender counting relay, or relays, and then to transmit either the one or two pulses required to set the sender relays for registering the particular digit involved. The modification is not required for digits 1 or 2 since in those instances only one or two pulses respectively are normally required for setting the sender relays.

*Seventh digit transmitted—Release of relay 5P6*

In the instance of the arrangement contemplated by the illustrative embodiment of the invention only the first seven digits transmitted are registered in the first or main sender; additional digits are registered in an auxiliary sender (not shown). While the auxiliary sender is preferably of similar general arrangment to the main sender, it is desirable for reasons not pertinent in the present connection that the digits be counted in the auxiliary sender on a normal basis that is each with its full pulse value.

In accordance with the novel arrangement contemplated the operation of the presetting means described is inhibited after the first seven digits are transmitted so that subsequent digits are transmitted with the respective full pulse value.

The operation of the output steering circuit (FIG. 7) has been described above and it was pointed out that after relay 7GS has operated preparatory to pulsing of the seventh digit, relay 7RS will operate at the next release of relay 5Z and will lock to off-normal ground through the make contact of its transfer pair 7RS–8(7) and break contact 7BS–10(7). Now after relay 7GS releases relay 5P6 will operate from ground, break contact 7GS–12(5), make contact 7RS–12(5), winding of relay 5P6 to battery; relay 5P6 upon operating locks to ground through its make contact 5P6–5(5) and make contact 2ON–2(5).

It will be noted, and has been previously pointed out above that, with relay 5P6 operated, the "premature operate" paths for the sender counting relays over leads P2, P4 and P6 included in cable 201 are interrupted at respective break contacts 5P6-6(3), 5P6–8(3) and 5P6–7(3) and also that the respective operate paths of relay 3SP are cut through in their normal way and are not diverted to a "one pulse" or "two pulse" path as is the case when relay 5P6 is in released position. Accordingly, with relay 5P6 in operated position each digit is transmitted with its full pulse value and there are no premature operations of sender relays.

While in the instance of the illustrative embodiment of the invention, it has been assumed that recycling is initiated after the seventh digit has been pulsed, it will be understood that this action may be effected at the end of a greater or lesser number of digits as desired. For example, the recycling might be arranged to take place after the transmission of eight digits in which case an additional relay would be added in the steering chain (FIG. 7) following relay 7GS and of similar circuit arrangement thereto.

If desired the circuits may be so arranged that registration in the converter may be limited to a predetermined maximum; by way of example it will be assumed that registration is to be limited to a maximum of ten digits.

As described above relays 2STR and 4BSI release following registration of the ninth digit. (It will be recalled that in the illustrated embodiment recycling takes place after transmission of the seventh digit.) When relay 2STR operates at the start of the tenth digit, relay 4RGA operates from ground, make contact 2ON–12(4), make contact of transfer pair 7ONI–2(4), make contacts 2STR–3(4) and 7RG–8(4), break contacts 4DSI–9(4) and 4BSI–9(4), make contact 4CSI–9(4), break contact of transfer pair 4RGA–12(4), winding of relay 4RGA to battery; relay 4RGA upon operating locks to off-normal ground through the make contact of its transfer pair 4RGA–12(4). The hold path of relay 4CSI is placed under control of make contact 2STR–3(4) through the make contact of transfer pair 4RGA–6(4). Since the operate path of relay 4DSI was opened at break contact 7RG–7(4) when relay 7RG operated at completion of the outpulsing of the third digit, relay 4DSI is prevented from operating and relay 4CSI releases when relay 2STR releases following registration of the tenth digit. With all input steering relays now released any additional digits received will not be registered.

It will be readily apparent that introduction of the novel arrangement contemplated by the invention involves only minor modifications in the existing converter and sender circuits. In the sender only the addition of a second operate path by way of shunt connections to the normal operate path of three of the counting relays is required, while in the converter only a single relay need be added. This is of course a highly desirable feature particularly from a space standpoint; in existing installations of this general nature the matter of finding room for additional equipment is usually troublesome.

It is to be understood that the above-described arrangements are illustrative of the applications of the principles of the invention. Numerous other arrangements may be devised by those skilled in the art without departure from the spirit and scope of the invention.

What is claimed is:

1. In a number transfer circuit comprising means for storing numbers, a register circuit, said transfer circuit being operable for transferring a plural digit number from said number storing means to said register circuit a digit at a time, means for transmitting pulses to said register circuit representing the digits of each number that is to be transferred, said register circuit including individual counting means for counting each of said pulses, means for stopping the transmission of said pulses to said register circuit upon the transmission of information representing a digit that is to be counted in said register circuit, means effective when a digit is to be transferred for directly setting certain of said individual counting means, and means effective after the operation of said last-mentioned means for operating said means for stopping the transmission of said pulses after the transmission of a sufficient number of pulses which together with said direct setting of said individual counting means causes the operative position of said register circuit to represent said digit that is to be transferred.

2. A number transfer circuit in accordance with claim 1 further comprising means responsive to the transfer of a predetermined number of digits from said storing means for inhibiting the operation of said means for directly setting said individual counting means whereby said register circuit is set only by the transmission of said pulses.

3. A number transfer circuit comprising means for storing a plural digit number, pulsing means, means for operating said pulsing means, a register circuit, a plurality of relays in said register circuit for counting and registering pulses, means controlled by said pulsing means for transmitting pulses representative of a digit comprising said stored number to said register circuit whereby to operate selected ones of said relays to register said digit, means for stopping the transmission of pulses to said register circuit upon the transmission of information representing the digit to be registered, means controlled by said means for storing for directly operating selected ones of said relays independently of said means controlled by said pulsing means, means effective following operation of said directly operating means for transmitting a sufficient number of pulses which together with said direct operating of said selected relays causes the registering in said register circuit of said digit, and means effective immediately thereafter for operating said stopping means.

4. A number transfer circuit in accordance with claim 3 further comprising means responsive to the transmission of a predetermined number of digits of said number to said register for inhibiting the operation of said directly operating means whereby said plurality of relays are subsequently operated only by said pulsing means.

5. A number transfer circuit in accordance with claim 3 further characterized in that said sufficient number of pulses comprises a single pulse when an odd digit is to be registered and comprises two pulses when an even digit is to be registered.

6. A number transfer circuit in accordance with claim 4 further characterized in that said pulsing means includes a first additional relay and that said means controlled by said pulsing means includes a transfer contact pair of said first additional relay connected in a first control path of said plurality of relays.

7. A number transfer circuit in accordance with claim 6 further characterized in that said stopping means includes a second additional relay and a contact of said second additional relay effective when closed to shunt said transfer contact pair.

8. A number transfer circuit in accordance with claim 6 further characterized in that said means for directly operating selected ones of said relays includes a second control path for said relays and that said inhibiting means includes a third additional relay, said third additional relay being effective when operated to interrupt said second control path.

9. In a telephone system, a register circuit including means for counting digit-representing direct current pulses transmitted thereto, a converter circuit including means for receiving multifrequency signals representative of a plurality digit directory number, means responsive to the reception of said signals by said converter circuit for storing said number, means for transmitting pulses to said register circuit to operate said counting means, means controlled by said means for storing for directly setting said counting means, and means effective after the operation of said direct setting means for sopping the transmission of said pulses after the transmission of a sufficient number of pulses which together with the direct setting of said counting causes the operative position of said register circuit to represent a digit represented by said multifrequency signals.

10. In a telephone system the combination defined by claim 9 further characterized in that said counting means includes a plurality of separate relays and an operate path for each of said relays affected by the transmission of said pulses and that said direct setting means includes auxiliary operate paths for each of said relays which are unaffected by the transmission of said pulses.

11. In a telephone system as defined by claim 10 further characterized in means responsive to transmission of a predetermined number of digits to said register circuit for inhibiting operation of said direct setting means whereby said register circuit is affected only by the transmission of said pulses.

12. In a telephone system the combination defined by claim 11 further characterized in that said inhibiting means includes an additional relay and contacts of said relay for controlling the completion of said auxiliary operate paths.

References Cited

UNITED STATES PATENTS 2,768,335 10/1956 Coley ------------- 317—140

KATHLEEN H. CLAFFY, *Primary Examiner.*

D. L. RAY, *Assistant Examiner.*

PO-1050
(5/69)

UNITED STATES PATENT OFFICE
CERTIFICATE OF CORRECTION

Patent No. 3,453,391 Dated July 1, 1969

Inventor(s) Richard S. Hubbell

It is certified that error appears in the above-identified patent and that said Letters Patent are hereby corrected as shown below:

A careful check of the specification and claims of the above mentioned patent against the file record discloses two errors therein chargeable to the Official printer.

Claim 9, column 14, line 22 change "plurality" to --pural--;

line 28 change "sopping" to --stopping--.

SIGNED AND
SEALED

OCT 28 1969

(SEAL)
Attest:

Edward M. Fletcher, Jr.
Attesting Officer

WILLIAM E. SCHUYLER, JR.
Commissioner of Patents

PO-1050
(5/69)

SUPERSEDING

UNITED STATES PATENT OFFICE
CERTIFICATE OF CORRECTION

Patent No. 3,453,391 Dated July 1, 1969

Inventor(s) Richard S. Hubbell

It is certified that error appears in the above-identified patent and that said Letters Patent are hereby corrected as shown below:

It is noted that a portion of the previous Certificate of Correction stated as follows:

Claim 9, column 14, line 22, change "plurality" to --pural--;

This is incorrect and should read:

Claim 9, column 14, line 22, change "plurality" to --plural--;

The remainder of the corrections on the previous Certificate of Correction are to remain as is.

SIGNED AND
SEALED
MAY 19 1970

(SEAL)
Attest:

Edward M. Fletcher, Jr.
Attesting Officer

WILLIAM E. SCHUYLER, JR.
Commissioner of Patents